United States Patent
Fassino et al.

(10) Patent No.: US 11,210,079 B2
(45) Date of Patent: Dec. 28, 2021

(54) METHOD FOR PROVIDING A FIRMWARE UPDATE OF A DEVICE

(71) Applicant: Schneider Electric Industries SAS, Rueil-Malmaison (FR)

(72) Inventors: Jean-Philippe Fassino, Gresin (FR); Jean-Michel Brun, Saint Etienne de Crossey (FR)

(73) Assignee: Schneider Electric Industries SAS, Rueil-Malmaison (FR)

(*) Notice: Subject to any disclaimer, the term of this patent is extended or adjusted under 35 U.S.C. 154(b) by 109 days.

(21) Appl. No.: 16/193,658

(22) Filed: Nov. 16, 2018

(65) Prior Publication Data

US 2019/0163465 A1 May 30, 2019

(30) Foreign Application Priority Data

Nov. 27, 2017 (EP) .................................. 17306645

(51) Int. Cl.
  *G06F 8/65* (2018.01)
  *H04L 29/06* (2006.01)
  (Continued)

(52) U.S. Cl.
  CPC .............. *G06F 8/65* (2013.01); *G06F 21/572* (2013.01); *G06F 21/64* (2013.01); *H04L 9/0891* (2013.01);
  (Continued)

(58) Field of Classification Search
  CPC . G06F 21/64; G06F 3/123; G06F 8/65; G06F 8/71; G06F 21/57; H04L 9/3247
  See application file for complete search history.

(56) References Cited

U.S. PATENT DOCUMENTS

2005/0191990 A1 9/2005 Willey et al.
2008/0307068 A1 12/2008 Willey et al.
(Continued)

FOREIGN PATENT DOCUMENTS

EP 2 196 936 A1 6/2010

OTHER PUBLICATIONS

Extended European Search Report dated Jun. 6, 2018 in European application 17306645.7, filed on Nov. 27, 2017 (with English Translation of Categories Cited & Written Opinion).
(Continued)

*Primary Examiner* — Ellen Tran
(74) *Attorney, Agent, or Firm* — Oblon, McClelland, Maier & Neustadt, L.L.P.

(57) ABSTRACT

A method provides a firmware update to an electronic device, to code signing for firmware updates of electronic devices, and a system therefor. In particular, the system and method for updates firmware that is authenticated through a public key infrastructure. The method includes an electronic device receiving a firmware update provided with a signature of a signing key, a signing certificate with a signature of a master key, and a revision number. The device verifies the signature of the master key on the signing certificate of the signing key, checks the revision number on the signing certificate of the signing key against a roll back counter, and verifies the signature of the signing key on the firmware update. The device then rejecting or accepting the received firmware update based on the outcome of the above verifying and checking.

18 Claims, 8 Drawing Sheets

(51) Int. Cl.
  *G06F 21/64* (2013.01)
  *G06F 21/57* (2013.01)
  *H04L 9/08* (2006.01)
  *H04L 9/32* (2006.01)
  *H04L 29/08* (2006.01)

(52) U.S. Cl.
  CPC .......... *H04L 9/3247* (2013.01); *H04L 9/3268* (2013.01); *H04L 63/0823* (2013.01); *H04L 63/123* (2013.01); *H04L 63/0442* (2013.01); *H04L 63/145* (2013.01); *H04L 67/12* (2013.01)

(56) References Cited

U.S. PATENT DOCUMENTS

| | | | | |
|---|---|---|---|---|
| 2010/0058317 | A1* | 3/2010 | Braams | G06F 21/572 717/171 |
| 2010/0185845 | A1 | 7/2010 | Takayama et al. | |
| 2010/0306546 | A1 | 12/2010 | Willey et al. | |
| 2012/0030461 | A1 | 2/2012 | Willey et al. | |
| 2013/0016840 | A1 | 1/2013 | Willey et al. | |
| 2013/0227538 | A1 | 8/2013 | Maruyama | |
| 2016/0191253 | A1* | 6/2016 | Pyle | H04L 9/3263 380/28 |
| 2017/0010881 | A1* | 1/2017 | Kawazu | G06F 8/65 |
| 2018/0004953 | A1* | 1/2018 | Smith, II | G06F 21/78 |

OTHER PUBLICATIONS

De Pinho, T. "UpdaThing: A secure and open firmware update system for Internet of Things devices," Tecnico Lisboa, Oct. 2016, p. 56.

* cited by examiner

METHOD FOR PROVIDING A FIRMWARE UPDATE OF A DEVICE

The present invention relates to code signing for firmware updates of electronic devices, a system for a public key infrastructure, and a method for providing firmware updates. In particular, it relates to a system and method for updating firmware that is authenticated through a public key infrastructure.

BACKGROUND

Electronic devices in operational technologies are using more and more onboard applications. A programmable automation device or a circuit breaker are just two examples of such electronic devices.

The onboard application or firmware in general periodically requires updating, in particular when improvements of the application have been developed or flaws need to be addressed. During the installation of a new version of the application on the electronic device, it is important to verify that the new version is appropriate for the electronic device in question and that the new version has been generated by an authorized company; i.e. an approved supplier or the manufacturer of the electronic device. Installing a version modified by an ill-intentioned third party may prevent operation of the device, or worse still, make operation of the device hazardous or dangerous for the user.

It is therefore desirable to update the applications of an electronic device by confidently authenticating the origin of any updates.

To that end, it is known to use electronic signatures present in the update of the application, the electronic device being provided with specific electronic signature verification capabilities.

However, since industry is seeking to minimize operating down-time or other losses, electronic devices are updated infrequently, for example only a number of times over several years of operation. As a result, when the electronic device has not been updated for some time, as in years or even decades, and several versions of the application's signature have been created in the interim, the verification capability of the electronic device is only able to verify electronic signatures that may have become obsolete. Moreover, under certain circumstances the signature key may have become compromised.

Another issue relates to root certificates, which are one of the fundamental tools of cryptography and can be used in various authentication systems to validate certain types of encryption. Authentication systems used in operation technology (OT) systems invariably rely on Internet connectivity to manage certificates with one or more Certificate Authorities. However, many OT systems do not have access to the Internet. For example, many power monitoring systems (e.g., circuit breaker, relay, metering device, power meter, etc.) are intentionally isolated from the Internet for security assurance. Accordingly, these devices do not have access to Certificate Authorities for certificate management. As a result, traditional methods of tying certificates back to a root of trust at a Certificate Authority on the Internet, as used with online systems, may not be possible. Nevertheless, the need to authenticate and validate received information, such as firmware updates, still exists. For example, it is desired that the firmware for an end device be signed and verified before it is accepted and executed. Unverified information can lead to system damage or exposed security. In the realm of industrial devices, and in particular, power monitoring systems, these concerns are of tremendous importance.

SUMMARY OF INVENTION

It is an object of the invention to address the above-mentioned drawbacks of updating firmware of electronic devices, and in particular the firmware embedded in these field devices.

According to the invention, this is achieved by providing a method that includes an electronic device receiving a firmware update provided with a signature of a signing key, a signing certificate with a signature of a master key, and a revision number. The device verifying the signature of the master key on the signing certificate of the signing key, checking a revision number on the signing certificate of the signing key against a roll back counter, and verifying the signature of the signing key on the firmware update. And the device rejecting or accepting the received firmware update based on the outcome of the above verifying and checking.

The method may also be implemented by a computer, the computer performing and/or orchestrating the various steps.

According to another aspect of the invention, there is provided a firmware update system. The system consisting of an electronic device having firmware, a Signature Management Module SMM and a roll back counter. The system further including a Hardware Security Module HSM having an online component storing one or more signing keys and an offline component storing one or more master keys. The system further including a signing portal for providing a software package with a signature by a private part of one of the signing keys stored in the HSM online component, and a signing certificate of the respective signing key provided with a signature by a private part of one of the master keys stored in the HSM offline component. Wherein the signing certificate includes a revision number. And wherein the SMM is arranged for checking the signature of the signing key by a public part of the respective signing key, the signature of the master key by a public part of the respective master key, and the revision number against the roll back counter.

In general, a public key infrastructure employs a set of private and public keys for signing and certificates for the purpose of verifying authenticity of the signature. Hence, in order to verify if firmware comes from an authorized provider, an electronic device checks the signature of the firmware; by verifying the signature placed by the private part of the singing key with the public part of the signing key. The public part of the signing key is usually provided through a certificate. The outcome of verifying the signing key is that if the firmware is indeed signed by the private part of the signing key this indicates that the origin of provider of the firmware is authenticated.

In this disclosure, in order to verify whether the signing key of the firmware provider is actually still valid, the device further checks the signing certificate with a Certificate Revocation List (CRL) which is signed by a private part of a master key. The outcome of verifying the master key is that if the signing certificate is indeed still valid this indicates that verification of the signing key provides a valid authentication of the firmware provider.

In one aspect, there is provided a method for updating firmware of an electronic device. A firmware update package is created, and then signed by a Hardware Security Module (HSM) with the private part of the signing key. An associated signing certificate with a revision number, or version number more in general, is further signed by the HSM with the private part of the master key. In addition, the HSM signs the CRL with the private part of the master key. The created firmware package is then sent to the electronic device, and when received the device checks the validity of the signing certificate by verifying the master key signature with the public part of the master key. The device further checks the validity of the CRL with the public part of the master key, and checks whether the signing key has not been revoked with CRL. In addition, the device checks the certificate revision number against a roll back counter and checks the signature on the firmware package with the public part of the signing key.

In one aspect, there is provided a method for revoking a signing key, which allows periodically, even only annually, to replace the signing key, which includes both the private and public parts. Accordingly, the method includes generating an updated signing key, providing the public part of the updated signing key in a firmware update package, updating the revision number of the signing certificate and applying the signature of the master key to the signing certificate. And then sending the firmware update package to the electronic device. Hence, the firmware update contains the updated signing key, while being signed by the current signing key. This allows, when received, the device to replace the currently stored public part of the signing key with the updated signing key. As the validation of a firmware package requires a valid public signing key, a correct revision number of the associated signing certificate and a signing certificate validly signed by the master key, these steps allow to use the updating of the revision number to indicate to the device that the stored public part of the signing key is to be replaced. The revision number may be increased prior to replacing the firmware, ensuring that forfeiting a package with a copied certificate will not be accepted.

The method for revoking a signing key further includes providing an updated signing certificate of the updated signing key and signing the updated signing certificate by applying the signature of the master key. As the device now stores the updated signing key, a next firmware update package may be signed by the updated signing key. When the signing key is updated, the associated signing certificate is revoked by updating the CRL with the to be revoked signing certificate of the signing key. And the HSM signs the CRL with the private part of the master key.

Accordingly, in case a signing key is compromised, the master key will still be valid, so a firmware update package having a signature certificate with an increased revision number and validly signed by the master key is still accepted. This combination allows updating of firmware without a risk of malicious firmware package being accepted, as that would require both the signing and the master key to be compromised.

In one aspect, there is provided a method for revoking a master key in a direct manner, which allows replacing a master key in case of compromise; when for example, the cryptographic algorithm has become outdated. The method for replacing the master key directly includes generating an updated master key and an updated master certificate signed by a domain key. Further included is generating an updated signing key and signing certificate signed by the updated master key, and providing a firmware update package with the public parts of both the updated keys and certificates. Then signing the firmware package by applying the signature of the current signing key and sending the firmware package to the device.

When the firmware package is received, and the signature, the revision number and the certificate are verified and validated, the device replaces both the currently stored master and signing keys with both updated keys.

With the updated keys stored in the device, the master key and signing key that were replaced may be revoked. Accordingly, a CRL contacting revoked master and signing keys may be updated and signed by the updated master key. Or separate master CRL and signing CRL may be updated. In the latter case, the master CRL is signing by the domain key and the signing CRL is signed by the master key.

In another aspect, there is provided a method for revoking a master key in an indirect manner, which provides a 2-step manner for replacing a master key in case of compromise. The method for replacing the master key directly includes generating an updated master key and updated master certificate signed by the domain key, and further generating a temporary master certificate signed by the current master key. Then creating a firmware package with the temporary master certificate, signing the firmware package with the current signing key and sending it to the device.

When received, the device recognizes the pattern of the temporary master certificate and replaces the stored master key with the updated key provided in the temporary master certificate. Thus, basically the temporary master certificate with the updated master key is disguised as signing a certificate. In this manner, a risk of trusting a low secure means, i.e. the signing key, for replacing a high secure means, i.e. the master key, may be avoided.

The indirect method further includes revoking the master key which has been replaced by updating the master CRL with the replaced master certificate and signing the master CRL with a domain key. Then generating a new signing key and a signing certificate and providing the signing certificate with the signature of the updated master key. And then sending a firmware package signed by the updated signing key along with the updated signing certificate which is signed by updated master key.

And then revoking the replaced signing certificate by updating the signing CRL, and signing the signing CRL with the updated master key.

Particular embodiments of the invention are set forth in the dependent claims. And further features, aspects, effects and details of the invention are described in the following detailed description of a number of exemplary embodiments, with reference to the drawings.

BRIEF DESCRIPTION OF THE DRAWINGS

By way of example only, the embodiments of the present disclosure will be described with reference to the accompanying drawing, wherein.

DETAILED DESCRIPTION

Figure 1:
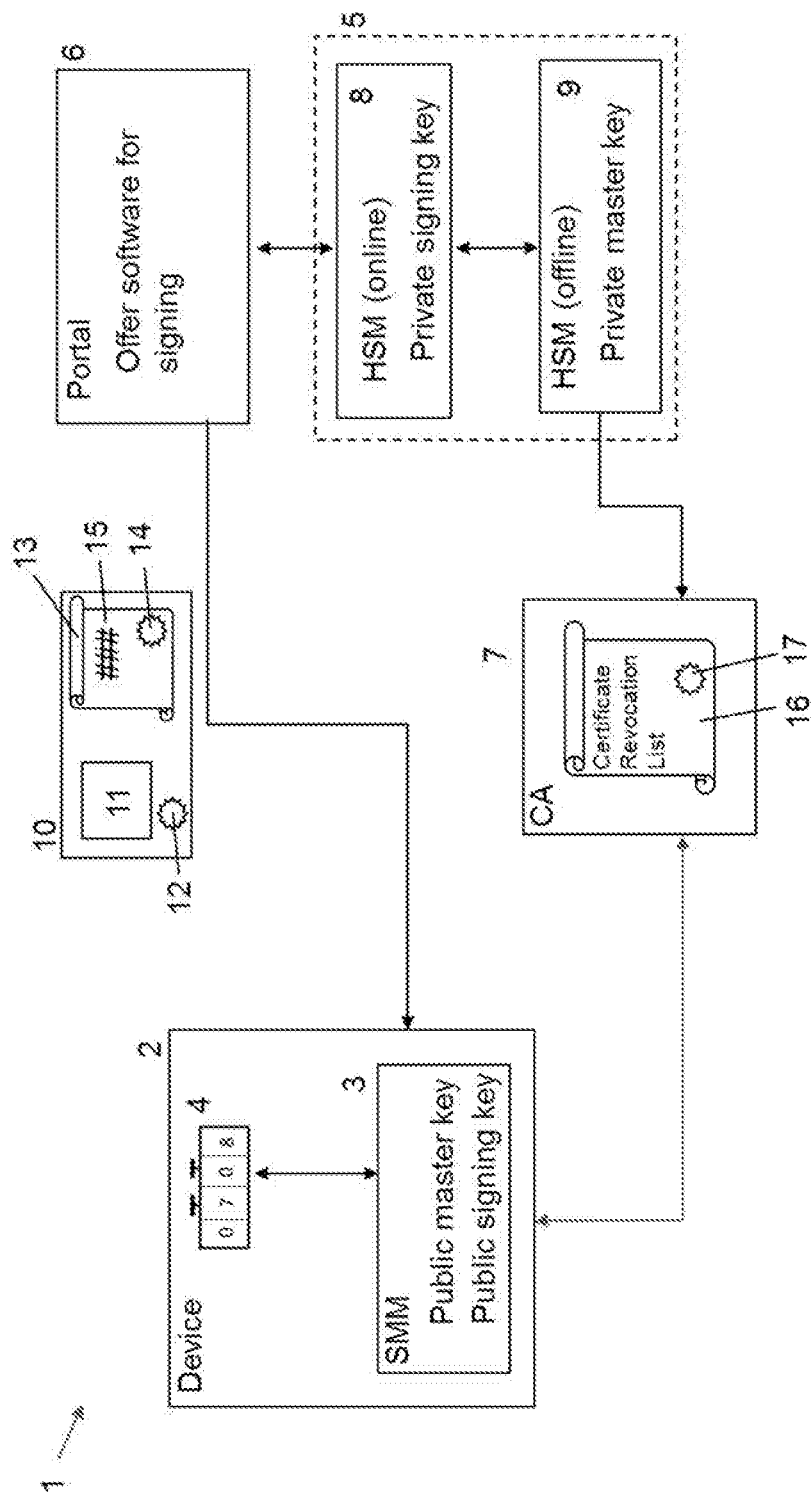
FIG. 1 illustrates schematically an example of a firmware update system in accordance with the invention.

Referring to FIG. 1, a system 1 for updating firmware is shown. An electronic device 2, which may be a circuit breaker, a relay, a metering device, a power meter or other operational technology equipment, is provided with firmware in order to perform its' function. The electronic device is further provided with a Signature Management Module SMM 3 and a roll back counter 4. These may be implemented as individual hardware components, as software objects stored in a memory module, or be part of the firmware of the device.

The firmware updating system 1 is provided with a Hardware security module HSM 5 and an automation software signing portal 6. In general, a HSM is a physical computing device that safeguards and manages digital keys for strong authentication and provides crypto processing. Such a module may be provided as a plug-in card, an external device or another form factor allowing storing of cryptographic keys inside a hardened, tamper-resistant device. It may also form an integral part of an enterprise level computer, as e.g. a Trusted Platform Module TPM, which uses a secure cryptographic integrated circuit (IC).

The Hardware Security Module HSM 5 has an online component 8 storing one or more signing keys and an offline component 9 storing one or more master keys. The online component 8 is preferably permanently available i.e. online accessible 24/7; or at least during normal operation. The online component 8 may be connected to via a private or local area network, and preferably accessible only from the signing portal. The offline component 9 may be in a switched off state during normal operation and is preferably only switched on when a new master key is to be created. The creation of a new master key consisting of a public part and a private part is commonly referred to as key ceremony. During the ceremony, the offline component will be switched on, which action itself may be subject to further security measures such as e.g. requiring simultaneous turning of two spatially separate switches. The offline component 9 should only be connected with a private network during such specific operations, and preferably accessible only from an administration station. Additional policies could require a quorum of operators k/N for enabling access to the HSM 5, whether online 8 or offline 9.

The automation software signing portal 6 is a local work station which an operator may access for creating a software package 10 that will contain the firmware update 11 and verification and/or authentication means Thereto, the firmware may be uploaded to the portal 6. Accessing the signing portal 6 is preferably limited or at least controlled by authentication means, such as password controlled access, a smart card, or other means that require an operator to authenticate him/herself. The signing portal 6 is arranged to enable the firmware update 11 or the software package 10 to be provided with a signature 12 by a private part of one of the signing keys stored in the HSM online component 8. The signing portal 6 further provides a signing certificate 13 of the respective signing key provided with a signature 14 by a private part of one of the master keys stored in the HSM offline component 9. The signing certificate 13 having the signature of one of the master keys, further has a revision number 15.

The Signature Management Module SMM 3 of the electronic device 2 is arranged for checking the signature 12 of the signing key on a firmware update by a public part of the respective signing key. The SMM 3 is further arranged for checking the signature 14 of the master key on the signing certificate by a public part of the respective master key. And the SMM 3 is further arranged for checking the revision number 15 against the roll back counter 4. Hence, both the signing keys and the master keys consist of a private key part and a public key part in accordance with the requirements for asymmetrical cryptography. The role of the master key in the method as disclosed is to function as a trusted anchor of the device.

The revision number 15 is provided on the signing certificate 13 to indicate whether it is the latest version or that it has been updated and replaces a previous version. The revision number 15 may comply with a series of consecutively increasing numbers as simple as 1, 2, 3, or comply with the date format. Or it may take the form of a more complex format, such as a predetermined number series as e.g. Fibonacci, prime numbers, or squares i.e. quadratic series.

With each update or replacement of the signing certificate 13, the roll back counter 4 needs to be updated so the roll back counter 4 indicates the latest revision number of the signing certificate 13. This may be arranged through the SMM 3 of the electronic device 2 or another suitable part of the electronic device 2, such as e.g. the roll back counter 4 itself.

The checking of the revision number 15 against the roll back counter 4 may consist of checking whether the revision number 15 is equal to the roll back counter 4. In which case, no update of the counter 4 is required. The checking of the revision number 15 may also include checking whether the revision number is greater than the roll back counter 4. Such as when the revision number is expected to comply with consecutively increasing numbers. If the revision number 15 is greater, than the roll back counter 4 needs to be updated. However, if the revision number 15 is smaller than the roll back counter 4, this is an indication that the signing certificate 13 is not the most recent and should not be accepted as valid. Hence, this provides an additional means of verifying the validity of the signing certificate 13.

Naturally, when the revision number 15 complies with another, more complex number series, the checking of the revision number 15 against the roll back counter 4 will perform another kind of check corresponding to the predetermined number series. In such case, the checking may include whether the revision number 15 is equal to an expected next number complying with a predetermined number series, such as Fibonacci, prime numbers, squares or quadratic series In the embodiment of FIG. 1, the system is also provided with a certificate authority 7 which maintains a Certificate Revocation List CRL 16. The CRL 16 is provided with the signature 17 of one of the master keys. This may be the signature of the same master key that is present on the signing certificate 13 or may be from another master key stored in the offline component 9. The certificate authority 7 may use a website, a cloud structure or other online available means for making the CRL 16 publicly available.

When the firmware update system 1 is provided with a CRL 16, the SMM 3 of the electronic device 2 is further arranged for checking i.e. authenticating the signature 17 of the CRL 16 by the public part of the master key, and whether the signing certificate 13 is valid i.e. not revoked.

Figure 2:
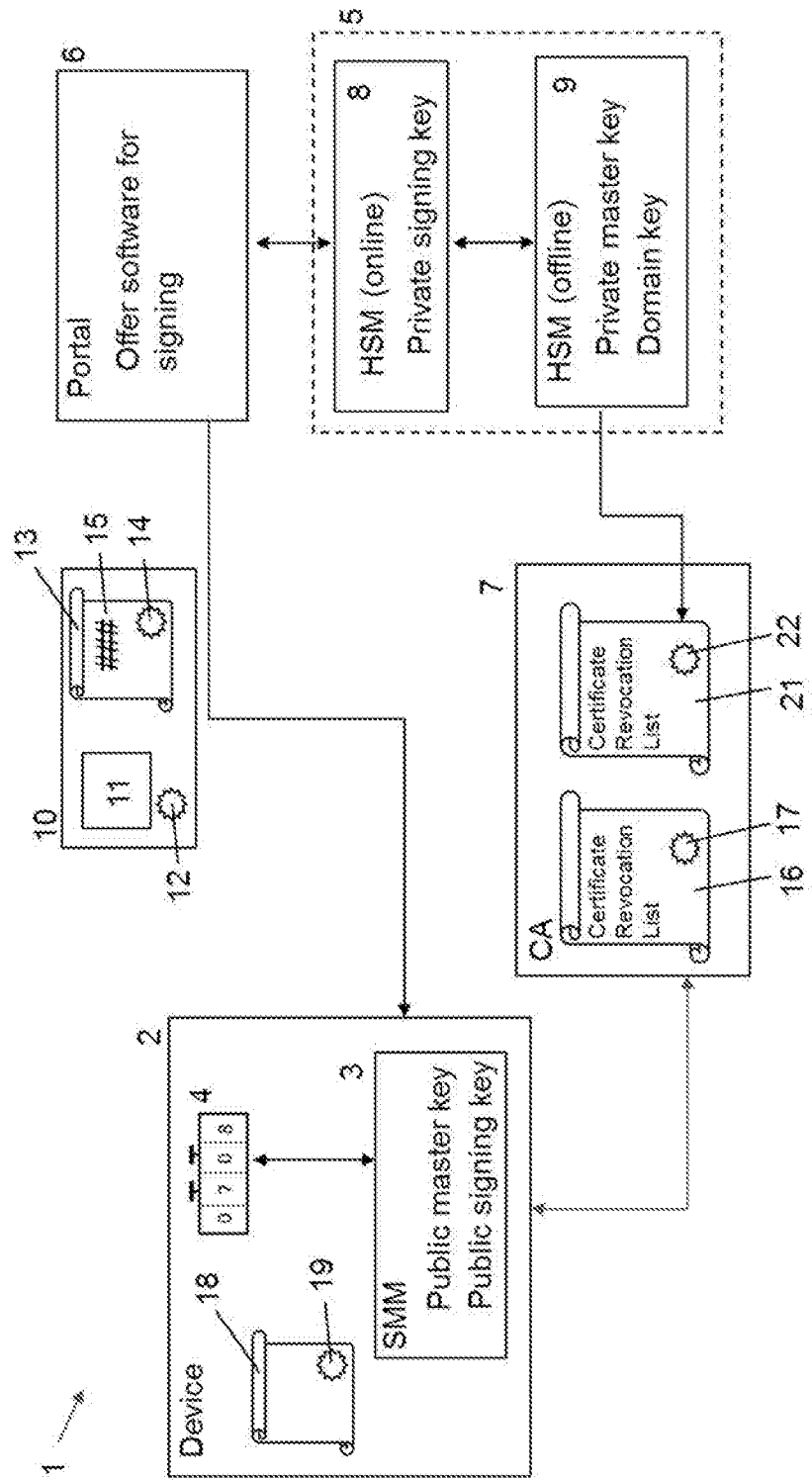
FIG. 2 illustrates schematically another example of a firmware update system in accordance with the invention.

Referring to FIG. 2, the firmware update system 1 of FIG. 1 is shown wherein the offline component 9 of the HSM 5 further stores a domain key i.e. root key. This domain key may be used to provide a signature 19 on a master certificate 18 for each respective master key with a private part of the domain key. The domain key may further be used to provide a signature 22 to a master certificate revocation list 21 with the private part of the domain key. The master certificate will contain the public part of the domain key and may be provided in the firmware itself. For a high-end device requiring high-end security the master certificate may be stored in a secure storage element, such as a TPM, in the electronic device 2.

Figure 3:
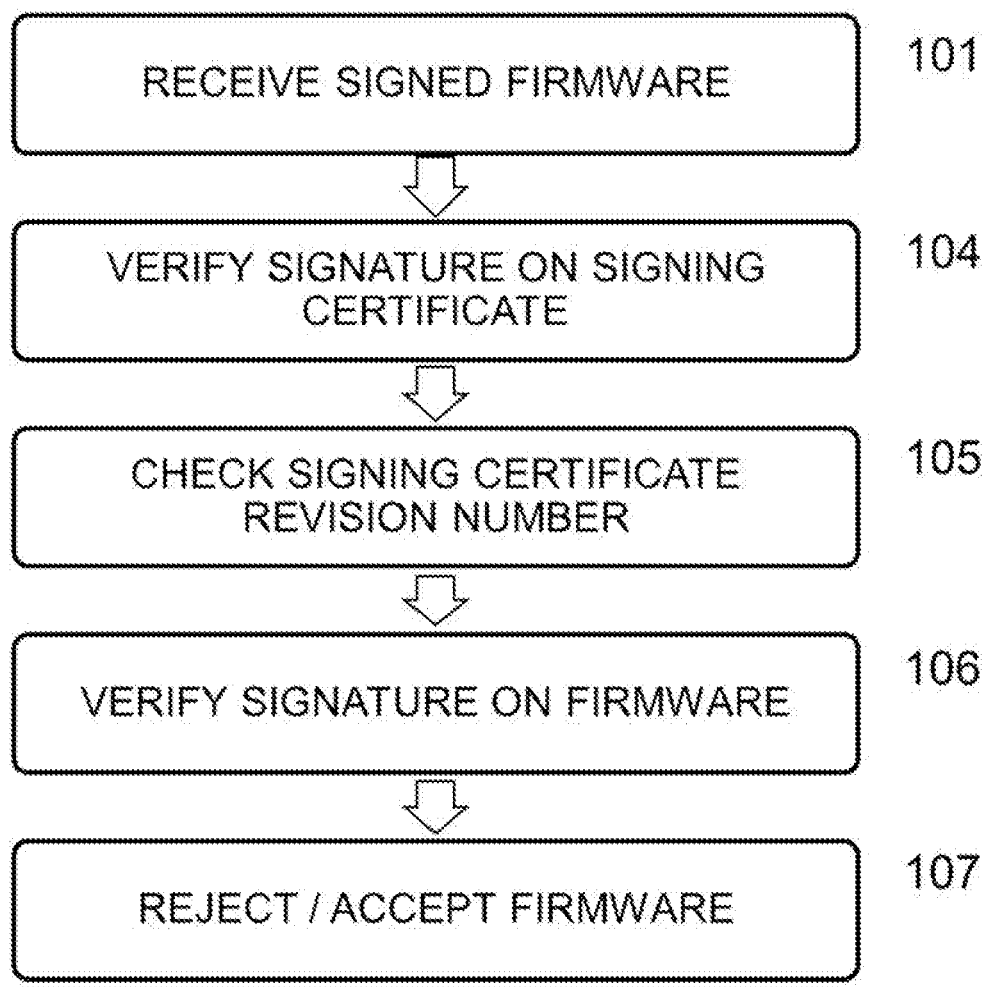
FIG. 3 illustrates schematically an example of a method for providing a firmware update in accordance with the invention.

Referring to FIG. 3, a method for providing a firmware update of the electronic device 2, as shown in FIGS. 1 and 2, will be illustrated. The electronic device 2 receives 101 a firmware update 11 provided with the signature of a signing key 12, the signing certificate 13 with a signature of the master key 14, and the revision number 15. When the firmware update 11 is received, the device verifies 104 the signature of the master key 14 on the signing certificate 13 of the signing key. The device 2 checks 105 the revision number 15 on the signing certificate 13 of the signing key against the roll back counter 4. The device 2 further verifies the signature of the signing key 12 on the firmware update 11. In this embodiment, the firmware is signed by the signing key. In other embodiments, it may be the complete software package containing the firmware update and the signing certificate that is signed with the signing key.

Based on the outcome of the above verifying 104, 106 and checking 105 the device either rejects or accepts 107 the received firmware update 11. When either the signature 14 on the signing certificate 13 or the signature 12 on the firmware 11 is not valid or when the revision number does not comply with the roll back counter, the firmware update 11 is rejected.

The checking 105 of the revision number 15 against the roll back counter 4 includes determining whether the revision number 15 is equal to the roll back counter 4. If so the signing certificate 13 has not been changed or updated. The checking 105 may include determining whether the revision number 15 is greater than the roll back counter 4. If so, the signing certificate 13 has been updated and the public part of the signing key stored in the device needs to be updated.

In addition, or instead, the checking 105 may include determining whether the revision number 15 matches an expected consecutive number complying with a predetermined number series. For example, number series such as Fibonacci, prime numbers, quadratic or other series. This may prevent certificate forgery through opportunistic or speculative gambling on increasing of the revision number for malicious intent.

If the checking 105 of the revision number indicates that the revision number on the signing certificate is greater or matches an expected consecutive number, the roll back counter 4 is to be updated accordingly, such that it shows the latest revision number.

Figure 4:
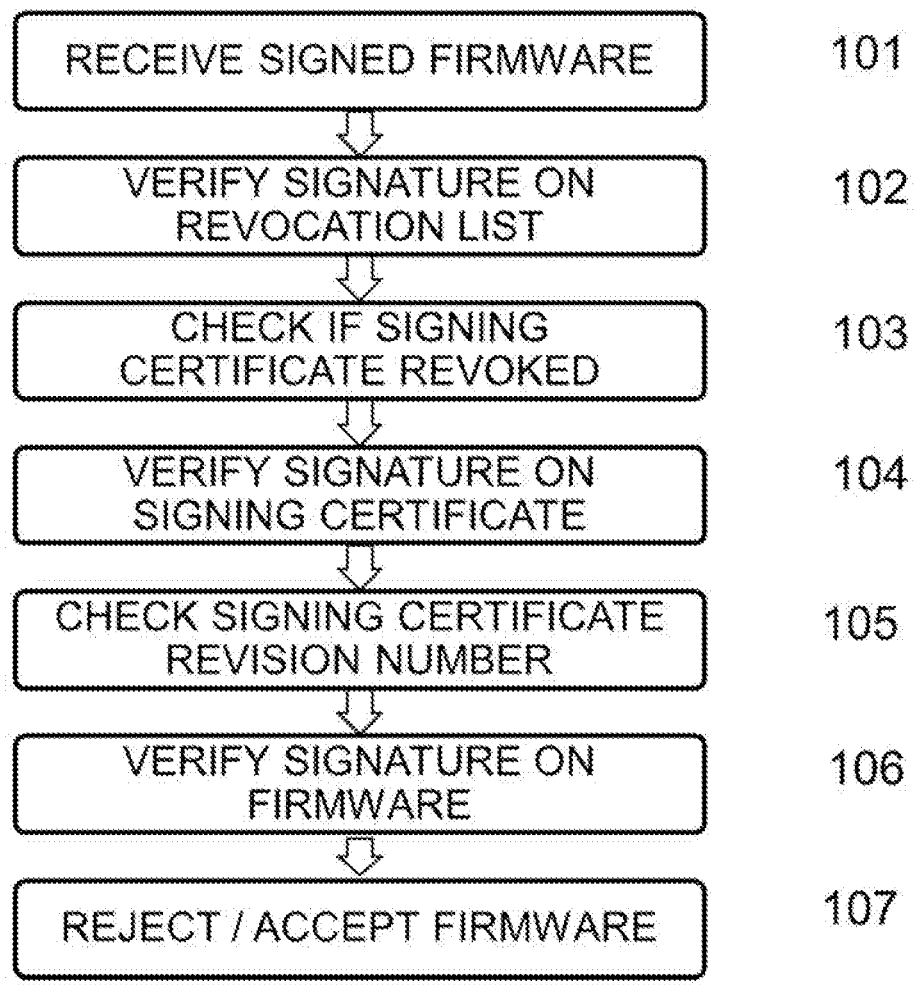
FIG. 4 illustrates schematically another example of a method for providing a firmware update in accordance with the invention.

To further increase the reliability of the signing certificate, use of certificate revocation list may be included which allows verifying whether a particular signing certificate has been revoked or not. Thereto, referring to FIG. 4, the method for providing the firmware update may further include verifying 102 a signature 17 on a revocation list 16 and checking 103 whether the signing certificate 13 is listed as revoked on the revocation list 16.

In order to prepare for updating firmware of the electronic device, the software package 10 needs to be created. Hence, a firmware provider, which may be an operator at the local site, or a supplier remotely accessing the site, needs to upload the firmware update to automation software signing portal 6 and offer it for signing. Accordingly, the method may further include authenticating a firmware provider and obtaining the firmware update form the authenticated firmware provider. With the firmware obtained at the portal 6, the firmware update may be signed by applying a signature with a private part of the signing key. The signing certificate of the signing key is provided with a revision number and the signing certificate is signed by applying a signature with a private part of the master key. The software package 10 containing the signed firmware update 11 and the signing certificate 13 will then be provided to the electronic device. This may be done online over a local area network or offline via smartcard, memory card or other suitable storage medium.

Preferably, all the keys used for providing signatures comply with the requirements of asymmetrical cryptography. Accordingly, all signing actions are performed using a private part of a key to provide a signature. And verifying any of the signatures includes applying a public part of the respective signing key or master key to the respective signing signature or master signature.

Figure 5:
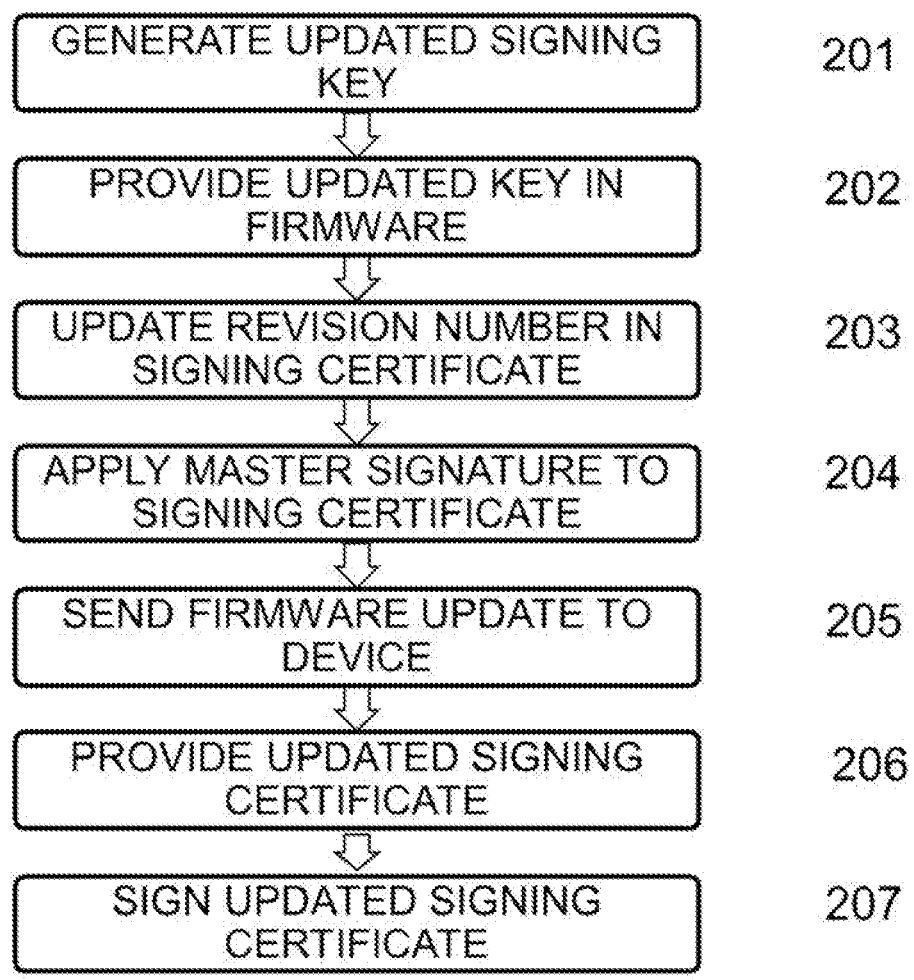
FIG. 5 illustrates schematically an example of a method for replacing a signing key in accordance with the invention.

The system and the method for providing a firmware update as described above are in particular suited to allow replacement and revocation of signing key. For example, when the signing key becomes obsolete or jeopardized. So, as part of providing a firmware update the signing key may be replaced by an updated signing key. Thereto, referring to FIG. 5, the method may include generating an updated signing key 201 and providing the public part of the updated signing key 202 in the firmware update. Further included is updating the revision number 203 of the signing certificate and applying the signature of the master key 204 to the signing certificate. The firmware update provided in this manner may be send 205 to the electronic device.

With the firmware update send to the device 205, the device will replace the stored signing key with the updated signing key. Or more in particular replace the public part of the signing key with the public part of the updated signing key. Which requires a next firmware update to be signed by the updated signing key and a corresponding updated signing certificate. Hence, the method may further include providing an updated signing certificate 206 of the updated signing key and signing the updated signing certificate 207 by applying the signature of the master key. The updated signing certificate now includes both the updated revision number and the updated signing key.

Figure 6:
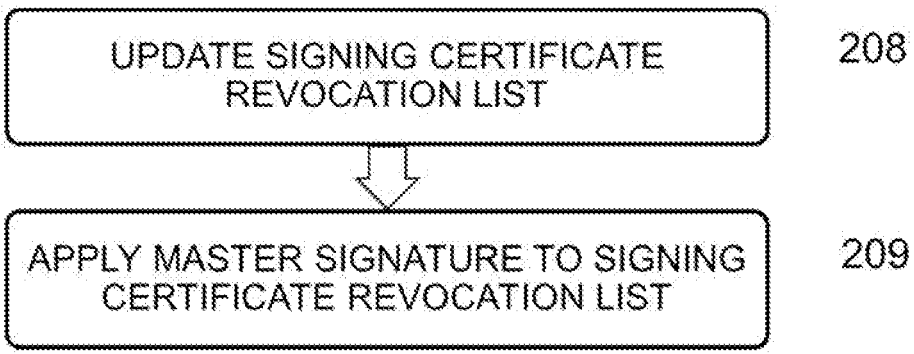
FIG. 6 illustrates schematically an example of a method for revoking a signing key certificate in accordance with the invention.

If a revocation list is part of the system, the replaced signing certificate may be revoked by updating the revocation list 208 with that replaced signing certificate, as shown in FIG. 6. And followed by signing the updated revocation list by applying the signature of the master key 209.

Figure 7:
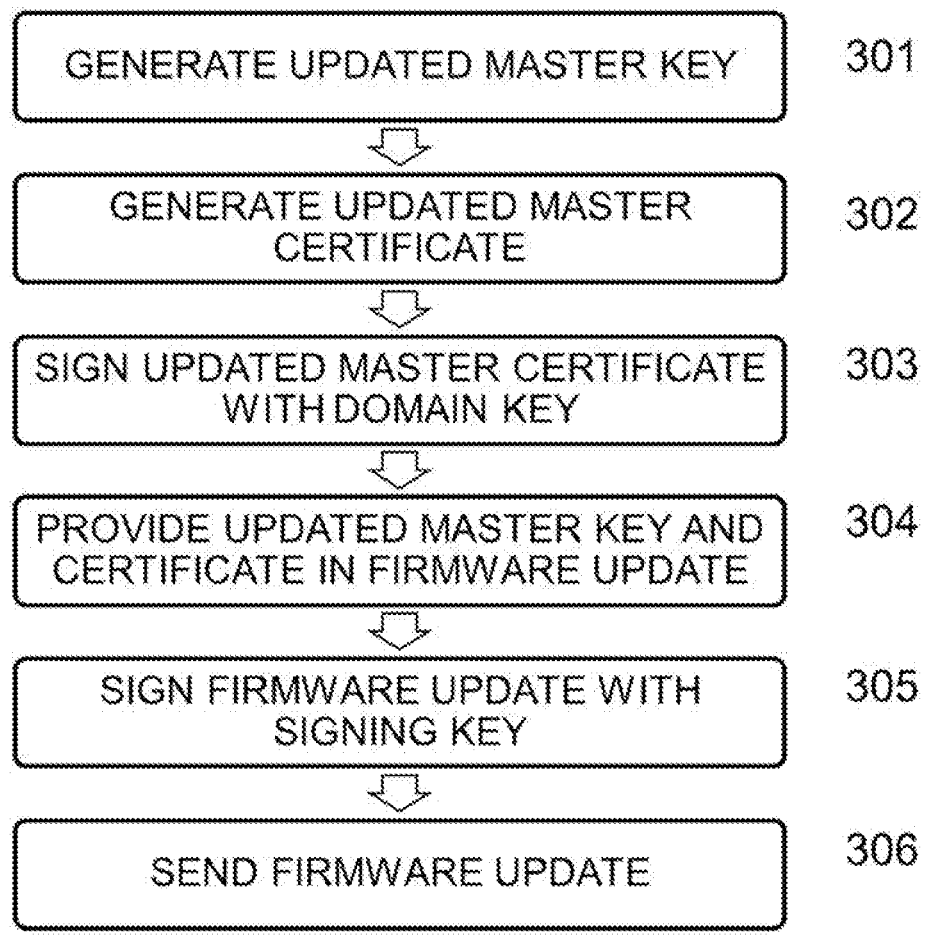
FIG. 7 illustrates schematically an example of a method for replacing a master key in accordance with the invention.

Over time, also the master key may become obsolete or jeopardized, requiring replacement of the master key and its' associated master certificate. Accordingly, referring to FIG. 7, the method may further include generating an updated master key 301 and generating an updated master certificate 302 of the updated master key. The updated master certificate is then signed by providing a domain signature 303 to the updated master certificate by applying a domain root key.

A public part of the updated master key and the updated master certificate are provided in the firmware update 304, which is then signed 305 by applying a signature of the signing key. The complete firmware update may then be send to the electronic device 306.

The method for updating the master key as just described is an example of directly replacing the master key in the electronic device. In another example, the method for updating the master key may also be performed in an indirect manner, which avoids relying on a signing key for replacing a master key. In this manner, a risk of trusting a low secure means, i.e. the signing key, for replacing a high secure means, i.e. the master key, may be avoided.

Figure 8:
FIG. 8 illustrates schematically an example of a method for replacing a master key indirectly in accordance with the invention.

Thereto, as shown in FIG. 8, the method includes generating again an updated master key 401 and generating a temporary master certificate 402 of the updated master key. A signature to the temporary master certificate is provided by applying the current master key 403. A public part of the updated master key and the temporary master certificate are provided 404 in the firmware update, which is signed by applying a signature of the signing key 405. The complete firmware update may then be send to the electronic device 406.

Figure 9:
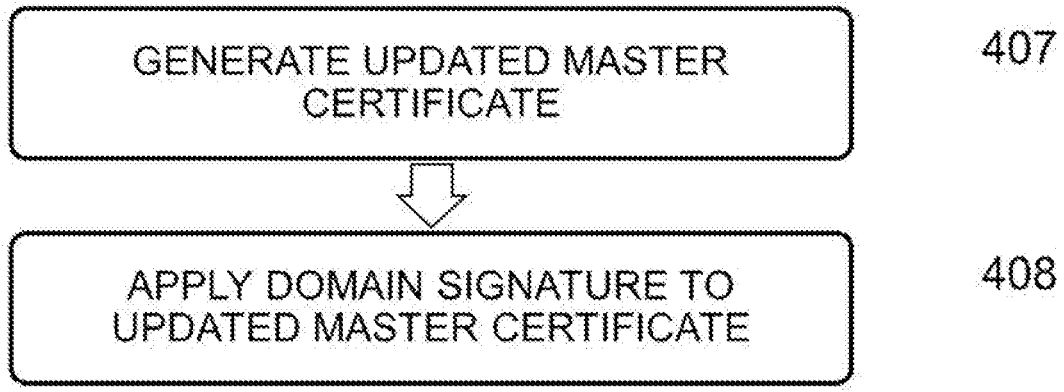
FIG. 9 illustrates schematically a further example of a method for replacing a master key indirectly in accordance with the invention.

With the master key replaced, instead of the temporary master certificate a final updated master certificate needs to be generated. Accordingly, as shown in FIG. 9, the method may further include generating an updated master certificate 407 of the updated master key. To which updated master certificate a domain signature is provided 408 by applying a domain root key. Hence, these actions shown in FIG. 9, will follow after the actions of the example shown in FIG. 8.

In the example of the indirect method of replacing the master key, the temporary master certificate is quasi-disguised is as a signing certificate, as it is signed by the current master key that is to be replaced.

Figure 10:
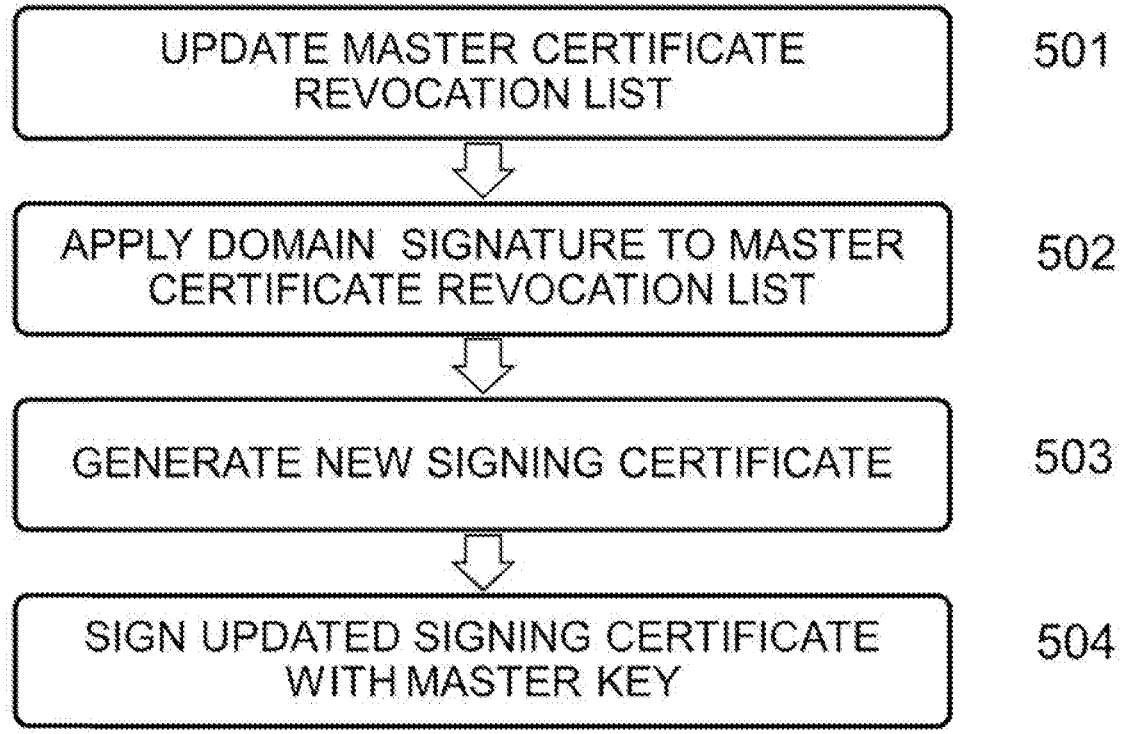
FIG. 10 illustrates another example of a method for revoking a master key certificate in accordance with the invention.

Whether the master key is replaced in a direct or indirect manner, once replaced, in either method a master certificate revocation list is to be updated. Both methods may therefor further include, as shown in FIG. 10, revoking the master certificate 501 by updating the revocation list with the master certificate. The updated master certificate revocation list is then signed by applying the signature of the domain key 502.

If the master key is replaced, it is preferred to generate a new signing certificate 503 of the signing key and to sign the new signing certificate 504 by applying the signature of the updated master key. As shown in FIG. 10. Moreover, as replacing a master key could indicate that the cryptographic algorithm for creating keys has been improved, a new signing key may be created according to the new cryptographic algorithm available. This may be performed according to the examples of the method for replacing the signing key as already described above.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for providing a firmware update to a first device, comprising:
   receiving together as a software package, at the first device, from a signing portal that provides software, the signing portal connected to a hardware security module (HSM) that contains an online portion that is designed to be always available and an offline portion that is designed to be only available when a new master key is created or when signing a signing certificate, the software package contains:
      a firmware update signed with a signing key, the signing performed by the online portion of the HSM,
      a signing certificate, the signing certificate being signed with the master key by an offline portion of the HSM, and
      a revision number on the signing certificate,
   verifying, at the first device, the signature on the firmware update using the public part of the signing key;
   verifying, at the first device, the signature of the signing certificate using the public part of the master key;
   checking, at the first device, the revision number on the signing certificate against a roll back counter; and
   rejecting or accepting, at the first device, the received firmware update based on the outcome of the above verifying and checking.

2. The method according to claim 1, wherein checking the revision number against the roll back counter comprises:
   determining whether the revision number:
      is equal to the roll back counter, and/or
      is greater than the roll back counter, and/or
      matches an expected consecutive number complying with a predetermined number series; and
   updating the roll back counter if the revision number on the signing certificate is greater or matches an expected consecutive number.

3. The method according to claim 1, further comprising:
   verifying a signature on a revocation list; and
   checking whether the signing certificate is listed as revoked on the revocation list.

4. The method according to claim 2, wherein the predetermined number series is Fibonacci, prime numbers, or quadratic.

5. A computer implemented method for providing a firmware update to an electronic device, comprising:
   at a signing portal, connected to a hardware security module (HSM) that contains an online portion that is designed to be always available and an offline portion that is designed to be only available when a new master key is created or when signing a signing certificate:
   authenticating a firmware provider;
   obtaining a firmware update from the authenticated firmware provider;
   signing the firmware update by applying a signature with a private part of the signing key, generated by an online portion of the HSM;
   providing a signing certificate with a revision number;
   signing the signing certificate by applying a signature with a private part of the master key generated by an offline portion of the HSM;
   providing the signed firmware update to the electronic device which verifies the signature on the firmware update using the public part of the signing key, verifies the signature of the signing certificate using the public part of the master key, checks the revision number on the signing certificate against a roll back counter, and rejects or accepts the received firmware update based on the outcome of the above verifying and checking.

6. The computer implemented method according to claim 5, further comprising:
generating an updated signing key;
providing the public part of the updated signing key in the firmware update;
updating the revision number of the signing certificate and applying the signature of the master key to the signing certificate;
sending the firmware update to the electronic device;
providing an updated signing certificate; and
signing the updated signing certificate by applying the signature of the master key.

7. The computer implemented method according to claim 6, further comprising:
revoking the signing certificate by updating the revocation list with the signing certificate; and
signing the updated revocation list by applying the signature of the master key.

8. The computer implemented method according to claim 5, comprising:
generating an updated master key;
generating an updated master certificate of the updated master second key;
providing a domain signature to the updated master certificate by applying a domain root key;
providing a public part of the updated master key and the updated master certificate in the firmware update;
signing the firmware update by applying the signature of the signing key; and
sending the firmware update to the electronic device.

9. The computer implemented method according to claim 5, comprising:
generating an updated master key;
generating a temporary master certificate of the updated master key;
providing a signature to the temporary master certificate by applying the master key;
providing a public part of the updated master key and the temporary master certificate in the firmware update; and signing the firmware update by applying the signature of the signing key.

10. The computer implemented method according to claim 9, further comprising:
generating an updated master certificate of the updated master key; and
providing a domain signature to the updated master certificate by applying a domain root key.

11. The computer implemented method according to claim 8, further comprising:
revoking the master certificate by updating the revocation list with the master certificate;
signing the updated revocation list by applying the signature of the domain root key;
generate a new signing certificate of the signing key; and
signing the new signing certificate by applying the signature of the updated master key.

12. A firmware update system, comprising:
a first electronic device comprising firmware, a Signature Management Module SMM, and a roll back counter;
a signing portal including a Hardware Security Module HSM including an online component storing one or more first keys, wherein the online component is designed to be designed to be always available and an offline component storing one or more second keys, wherein the offline component is designed to be only available when a new master key is created or when signing a signing certificate; and
the signing portal device configured to sign:
a software package by a private part of the signing key stored in the HSM online component, and
a signing certificate by a private part of the master key stored in the HSM offline component,
wherein the signing certificate comprises a revision number, and
wherein the SMM is configured to
verify the signature of the software package by the public part of the respective signing key, and
verify the signature of the signing certificate by the public part of the respective master key, and
check the revision number against the roll back counter, and
accept or reject the firmware update based on the outcome of the above verifying and checking.

13. The firmware update system according to claim 12, wherein the HSM offline component further stores a domain/ root key;
which domain key is used:
to provide a signature to a master certificate for each respective master key with a private part of the domain key; and
to provide a signature to a master certificate revocation list with the private part of the domain key.

14. The firmware update system according to claim 12, further comprising a Certificate Revocation List CRL provided with the signature of the master key; and
wherein the SMM is further arranged for checking:
the signature of the CRL by the public part of the master key; and
whether the signing certificate is valid and/ or not revoked.

15. The firmware update system according to claim 12, wherein the roll back counter indicates the latest revision number of the signing certificate;
wherein the roll back counter is updated with each certificate update/replacement; and wherein the checking of the revision number against the roll back counter by the SMM comprises:
checking whether the revision number is equal to the roll back counter; and/or
checking whether the revision number is greater than the roll back counter; and/or
whether the revision number matches an expected consecutive number complying with a predetermined number series; and
wherein the device is arranged for updating the roll back counter if the revision number on the signing certificate is greater or matches an expected consecutive number.

16. The firmware update system according to claim 12, wherein the software package comprises a firmware update for an electronic device.

17. A non-transitory computer readable medium comprising instructions which, when executed on at least one computer processor, cause the at least one computer processor to carry out a method comprising:
at a signing portal, connected to a hardware security module (HSM) that contains an online portion that is designed to be always available and an offline portion that is designed to be only available when a new master key is created or when signing a signing certificate:

authenticating a firmware provider;
obtaining a firmware update from the authenticated firmware provider;
signing the firmware update by applying a signature with a private part of the signing key, generated by an online portion of the HSM;
providing a signing certificate with a revision number;
signing the signing certificate by applying a signature with a private part of the master key, generated by an offline portion of the HSM; and
providing the signed firmware update to the electronic device that verifies the signature on the firmware update using the public part of the signing key, verifies the signature of the signing certificate using the public part of the master key, checks the revision number on the signing certificate against a roll back counter, and rejects or accepts the received firmware update based on the outcome of the above verifying and checking.

18. The non-transitory computer readable medium according to claim 17, comprising further instructions which, when executed on at least one computer processor, cause the at least one computer processor to further implement the method comprising:
generating an updated signing key;
providing the public part of the updated signing first key in the firmware update;
updating the revision number of the signing certificate and applying the signature of the master key to the signing certificate;
sending the firmware update to the electronic device;
providing an updated signing certificate; and
signing the updated signing certificate by applying the signature of the master key.

\* \* \* \* \*